July 28, 1931. G. B. COUBROUGH 1,816,212
METHOD AND APPARATUS FOR LIQUEFYING VAPOR MIXTURES
Filed July 3, 1929

Patented July 28, 1931

1,816,212

UNITED STATES PATENT OFFICE

GEORGE B. COUBROUGH, OF LONG BEACH, CALIFORNIA, ASSIGNOR TO WALTER E. LUMMUS, OF LYNN, MASSACHUSETTS

METHOD AND APPARATUS FOR LIQUEFYING VAPOR MIXTURES

Application filed July 3, 1929. Serial No. 375,712.

The present invention relates to methods and apparatus for liquefying or condensing vapor mixtures, more particularly, vapor mixtures containing substances of different degrees of volatility, such as occur in the distillation of petroleum oils.

The liquefaction of vapor mixtures, particularly when the constituents comprise materials having a considerable range of boiling points is usually attended with some difficulty, because of the presence of a remnant quantity of constituents of relatively high volatility which resist condensation. Thus, in the condensation of heavy petroleum vapors, the constituent vapors of highest boiling point are most easily liquefied, vapors of intermediate boiling points are condensed with increasing difficulty, and the most volatile vapors only at great expense, if at all. Under vacuum, the boiling points of the lightest constituents may, in many instances, so closely approach the temperature of the available cooling liquid that condensers of inordinately large size are required. It is evident that in vacuum distillation, it is essential that the remnant of vapors be condensed, not so much for the purpose of recovering the vapors themselves, which may be of small value, but rather to maintain the vacuum.

The object of the present invention is to effect complete condensation or liquefaction of all vapors in a vapor mixture, even though the mixture may include constituents having a wide range of boiling points.

With this object in view, the present invention consists in a method and apparatus whereby the greater part of the vapors including the heavier or less volatile constituents are first liquefied, the remaining vapors are then subjected to a condensing action to recover a fraction of medium volatility, and the final relatively volatile remnant is subjected to intimate direct contact with the original heavy non-volatile liquid obtained as a result of the first condensation. The liquefaction of the volatile remnant is thus accomplished by direct contact with the heavier liquid, and not only takes advantage of the transfer of heat, but also of the dissolving or absorbing effect of the liquid. Inasmuch as the intermediate constituents have already been removed in the second condensing step, the heavy liquid has a considerable affinity for the light vapors. The intermediate condensate may afterward be mixed with the mixture of light and heavy condensates, if desired, or it may be recovered as a separate product.

Figure 1:
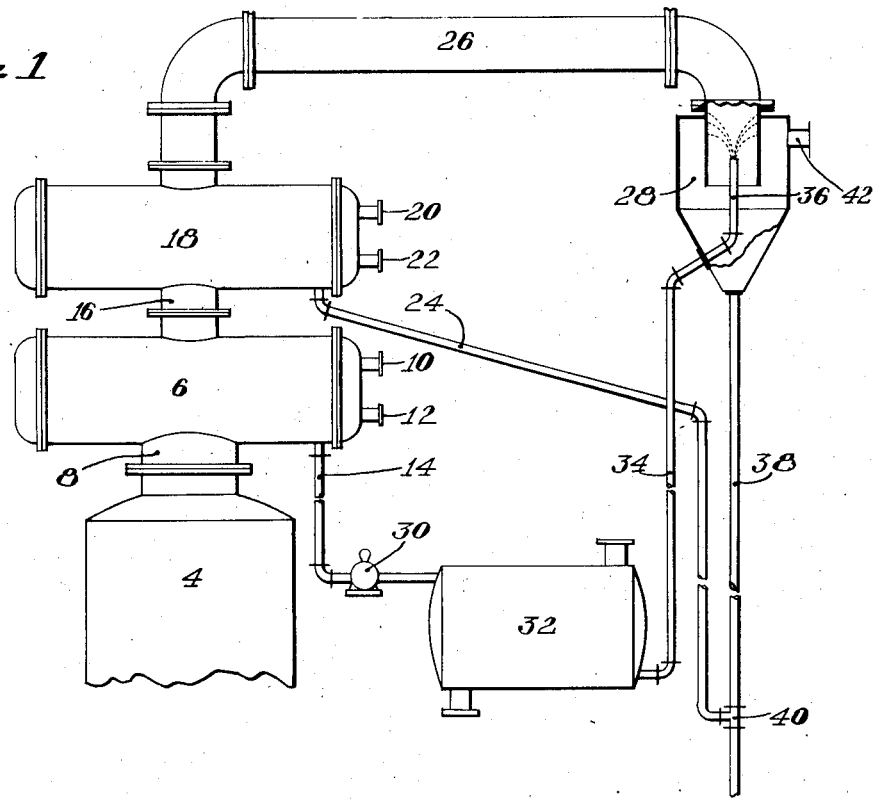
Figure 2:
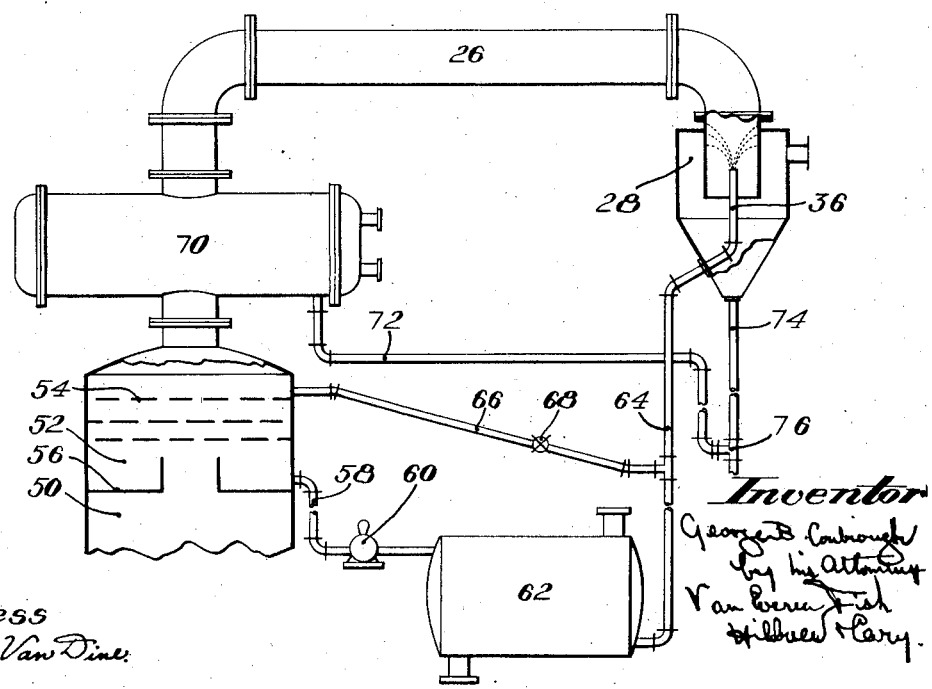

In the accompanying drawings showing the preferred form of the invention applied to vacuum distillation of petroleum oils, Fig. 1 illustrates one form of condensing system; and Fig. 2 illustrates a modified form of the system.

Referring to Fig. 1, the oil vapors ascending the vacuum column 4 are passed directly into an overhead surface condenser 6 through the vapor connection 8. The condenser tubes are cooled by any suitable cooling fluid circulated from the inlet 10 to the outlet 12. The vapors may comprise a mixture of constitutents ranging in boiling point from 150° F. or lower to 500° F. or over under an absolute pressure of a few millimeters. In the condenser 6, the greater portion of the mixture is condensed. This condenser may be of moderate size inasmuch as condensation of the entire vapor is unnecessary. The condensate is drawn off through a pipe 14.

The uncondensed vapors pass through the connection 16 to a second condenser 18 to which cooling fluid is passed from the inlet 20 to the outlet 22. In this condenser, the greater part of the remaining vapors are condensed, leaving only the final remnant of highly volatile or difficulty condensable vapors. The condensate is drawn off through a pipe 24.

The remnant of light vapors passes through the vapor pipe 26 to a countercurrent contact apparatus 28, which forms a jet condenser wherein the vapors are subjected to direct contact with the heavy condensate drawn from the first condenser. To this end, the pipe 14 leads to a pump 30 which is connected with a cooler 32 wherein the condensate is cooled to as low a temperature as practicable. The cooler connects by a pipe 34 with a spray pipe 36 in the jet condenser 28. The heavy liquid is sprayed, as indicated by the dotted lines, in the path of the descending light vapors. By the cooling action of the liquid on the vapors, as well as by the dissolving effect, all of the vapors are effectively liquefied. The mixture of the heavy and light constituents is drawn from the condenser 28 by a pipe 38, which leads to the usual look box (not shown). The pipe 24 which carries the intermediate condensate may run to a separate look box, whereby two final materials are obtained, the first comprising a mixture of the lightest and heaviest oils, and the other comprising the intermediate oils. As shown in Fig. 1, however, the pipes are connected at 40 to obtain a single condensate product.

The vacuum is maintained in the system by a suitable pump or jets connected to the contact apparatus 28 at 42.

In order that the pump 30 and the cooler 32 may not be required to be packed or sealed against the vacuum, the pipes 14 and 34 are preferably of a length not less than the height of a barometric column of the liquid. Moreover, the connection 40 should be made at a level where the liquids have attained some pressure, in order to eliminate any tendency to vaporize the light ends by contact with the relatively warm intermediate condensate.

The apparatus shown in Fig. 2 employs for the first condensing step the general method disclosed in my co-pending application, Serial No. 355,870. The tower 50 through which the vapors ascend is provided with an upper condensing chamber 52 having contact promoting means, illustrated as decks 54, and a collecting deck 56. The vapors passing through the decks 54 are condensed by a countercurrent of liquid, which comprises the initial heavy condensate of the vapors themselves. The condensate is drawn off the collecting deck through a pipe 58 and pumped by a pump 60 through a cooler 62 into a pipe 64. A connection 66 leads from the pipe 64 to the top of the column. Thus, some of the vapors ascending the column are liquefied by countercurrent contact with the descending liquid admitted in the column by the pipe 66. The amount of vapors condensed will depend upon the proportion of condensate returned through the pipe 66 and for the purpose of controlling this quantity, a valve 68 is included in the line.

Uncondensed vapors from the column pass into an overhead condenser 70 which performs the same function as the condenser 18 in Fig. 1. An intermediate condensate fraction is drawn off at 72. The remnant of light vapors passes through the vapor pipe 26 into the contact apparatus 28, which parts are identical with similarly numbered parts of Fig. 1. The outlet pipe 64 of the cooler connects with the spray pipe 36 of the contact apparatus 28 to spray the heavy condensate into the vapors. It will be seen that a portion of the relatively non-volatile condensate is employed for effecting fractionation of the heavy material in the condensing chamber 52 of the tower and the remainder of the heavy condensate is employed to liquefy and dissolve the remnant of light vapors passing over from the condenser 70. The mixture of the heavy oils with the light fraction dissolved or absorbed therein passes out of the contact apparatus 28 through the pipe 74 which is connected with the intermediate condensate pipe 72 at 76.

The apparatus shown in Fig. 2 commends itself because of its simplicity in effecting condensation of the relatively non-volatile fraction, and also because the cooler 62, being placed at a sufficiently low level, does not require to be sealed or packed against the vacuum.

It will be seen that both modifications of the invention bring about entire condensation of the vapors, first, by obtaining a plurality of condensates of progressively increasing volatility, and then employing a non-adjacent relatively non-volatile condensate to contact directly with the remnant of light vapors. The liquefaction of the highly volatile vapors therefore depends not only upon the transfer of heat from the vapors to the liquid, but also upon the capacity of the liquid for dissolving the vapors and holding them in equilibrium. A heavy non-volatile oil has a definite capacity for holding lighter oils in equilibrium therewith, even though the lighter oils might, if separated from the mixture, tend to volatilize readily. This capacity of a heavy oil to maintain a lighter oil in equilibrium therewith is limited. If, therefore, the partial condensates from the first two condensing steps were mixed prior to contact with the remnant of light vapors, the ability of the heavy oil to assimilate the light vapors would be materially lessened, because the heavy oil would then be more or less saturated with the intermediate oils. However, by first isolating the intermediate oils through the second condensing step, the non-volatile or heavy oils have a maximum capacity for absorbing the light vapors. Therefore, by obtaining a plurality of condensates and subjecting the remnant of light vapors to direct contact with a non-adjacent condensate, the maximum degree of absorption is attained. By the present invention, all of the vapors can be condensed, which, as has been previously explained, is of the utmost importance in vacuum distillation in order that the vacuum may be maintained.

Although the invention has been described as embodied in a method and apparatus for condensing petroleum oil vapors under vacuum, it will be understood that the invention is applicable to any materials and to operations at any pressures. For example, although reference has been made to the division if materials into three condensates, which are finally mixed, the use of the process for operation on substances having only two constituents is not intended to be excluded. Thus, in condensing a substance having only two constituents, as distinguished from petroleum oils, which have a large number of constituents, the first condensate fraction would consist principally of the heavier constituent, with perhaps a small proportion of the lighter, the second condensate would consist of an intermediate mixture of both constituents, and the final remnant of vapors would comprise principally the lighter constituent, with little or none of the heavier, this final remnant being then dissolved in and condensed by the initial heavy material obtained from the first condensation.

Having thus described the invention, what is claimed is:

1. A condensing apparatus comprising a tower, a countercurrent condensing chamber in the tower to obtain an initial heavy condensate, means for continuously pumping condensate through the tower in counter-current to the vapors, means for cooling the condensate externally of the column, means for condensing a part of the uncondensed vapors to form an intermediate condensate, and means for causing intimate contact of the remnant vapors with a part of the initial heavy condensate.

2. A method of condensing vapors which consists in passing the vapors upwardly through a condensing zone, withdrawing an initial condensate from the condensing zone, cooling the condensate thus withdrawn and continuously pumping a portion thereof into the condensing zone for contact with the vapors, passing the uncondensed vapors from the condensing zone into a condenser to obtain a second condensate, and subjecting the final remnant of light vapors to intimate direct contact with the remaining portion of the initial condensate.

In testimony whereof I have signed my name to this specification.

GEORGE B. COUBROUGH.